(12) United States Patent
Kim et al.

(10) Patent No.: US 9,420,327 B2
(45) Date of Patent: Aug. 16, 2016

(54) USER TERMINAL APPARATUS AND UI PROVIDING METHOD THEREOF

(75) Inventors: Jung-a Kim, Suwon-si (KR);
Yong-hwan Kwon, Seongnam-si (KR);
Joo-youn Kim, Seoul (KR); Bum-jin Lee, Goyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 612 days.

(21) Appl. No.: 13/331,462

(22) Filed: Dec. 20, 2011

(65) Prior Publication Data
US 2012/0173003 A1 Jul. 5, 2012

(30) Foreign Application Priority Data

Dec. 30, 2010 (KR) ........................ 10-2010-0139145

(51) Int. Cl.
*G05B 11/01* (2006.01)
*G05B 15/00* (2006.01)
(Continued)

(52) U.S. Cl.
CPC ... *H04N 21/42207* (2013.01); *H04N 21/42209* (2013.01); *H04N 21/42224* (2013.01); *H04N 21/42227* (2013.01)

(58) Field of Classification Search
CPC ............ H04N 5/4403; H04N 5/44582; H04N 21/42204; H04N 21/4622; H04N 21/47; H04N 21/25891; H04N 21/4126; H04N 21/4131; H04N 21/43615; H04N 21/485; H04N 21/42207; H04N 21/42224; H04N 21/42227; H04N 2005/4435; G06F 1/169; G06F 3/048; G06F 3/04817; G06F 3/04842; G06F 3/0484; G08C 2201/30; G08C 2201/92; H03J 2200/23; H03J 2200/25; H03J 2200/26; H04L 12/2816; H04L 41/509; G06Q 20/32; G11B 19/025; G11B 19/027; H04M 1/72527; H04M 1/7253; H04M 2250/02; H04W 88/02; H04B 1/202
USPC .......... 700/17–19, 83–85; 715/700, 716, 718, 715/733, 739, 744–747, 764, 810, 835, 715/864; 709/230, 231; 725/37, 38, 59; 345/156, 168, 173; 455/418–420, 455/552.1, 557
See application file for complete search history.

(56) References Cited

U.S. PATENT DOCUMENTS 6,662,020 B1 * 12/2003 Aaro et al. ................ 455/552.1
6,993,722 B1 * 1/2006 Greer et al. .................... 715/739
(Continued)

OTHER PUBLICATIONS

Extended European Search Report Issued on Apr. 12, 2012 in corresponding European Patent Application No. 11190073.4.
(Continued)

*Primary Examiner* — Crystal J Barnes-Bullock
(74) *Attorney, Agent, or Firm* — Sughrue Mion, PLLC (57) ABSTRACT

A user terminal apparatus and a user interface providing method are provided. The user terminal apparatus providing a control mode to control an apparatus to be controlled and an application mode to operate applications includes a display unit which displays a control mode providing screen and an application mode providing screen, a user interface unit which receives an input of a user's order to select one of the control mode and the application mode, a communication interface unit which communicates with the apparatus to be controlled, and a controller which controls, if the control mode is selected, to display a control screen corresponding to the state of the apparatus to be controlled based on state information of the apparatus to be controlled which is received through the communication interface unit.

32 Claims, 8 Drawing Sheets

(51) Int. Cl.
*G06F 3/00* (2006.01)
*G06F 3/048* (2013.01)
*G06F 3/14* (2006.01)
*G06F 13/00* (2006.01)
*H04N 5/445* (2011.01)
*G06F 3/041* (2006.01)
*H04M 3/00* (2006.01)
*H04N 21/422* (2011.01)

(56) References Cited

U.S. PATENT DOCUMENTS

| | | | | |
|---|---|---|---|---|
| 7,831,930 B2 * | 11/2010 | Dresti et al. | | 715/835 |
| 7,895,532 B2 * | 2/2011 | Scott et al. | | 715/810 |
| 8,036,650 B2 * | 10/2011 | Jang | | 455/420 |
| 8,281,045 B2 * | 10/2012 | Higuchi et al. | | 710/8 |
| 8,473,865 B2 * | 6/2013 | Huang et al. | | 715/810 |
| 8,483,765 B2 * | 7/2013 | Cho | | 455/566 |
| 2003/0103088 A1 | 6/2003 | Dresti et al. | | |
| 2006/0041655 A1 | 2/2006 | Holloway et al. | | |
| 2009/0153289 A1 | 6/2009 | Hope et al. | | |
| 2009/0239587 A1 | 9/2009 | Negron et al. | | |
| 2009/0300511 A1 * | 12/2009 | Behar et al. | | 715/745 |
| 2011/0191516 A1 * | 8/2011 | Xiong et al. | | 710/305 |
| 2012/0066675 A1 * | 3/2012 | Shelansky et al. | | 717/178 |
| 2015/0007201 A1 * | 1/2015 | Cho | | 719/320 |

OTHER PUBLICATIONS

Communication dated Apr. 29, 2015 issued by the European Patent Office in counterpart European Patent Application No. 11190073.4.
Communication issued Oct. 2, 2015, issued by the European Patent Office in counterpart European Patent Application No. 11190073.4.

* cited by examiner

USER TERMINAL APPARATUS AND UI PROVIDING METHOD THEREOF

CROSS-REFERENCE TO RELATED APPLICATIONS

This application claims priority from Korean Patent Application No. 10-2010-0139145, filed on Dec. 30, 2010, in the Korean Intellectual Property Office, the disclosure of which is incorporated herein by reference in its entirety.

BACKGROUND

1. Field

Apparatuses and methods consistent with exemplary embodiments relate to a user terminal apparatus and a user interface (UI) providing method thereof, and more particularly, to a user terminal apparatus which provides a plurality of operation modes and a UI providing method thereof.

2. Description of the Related Art

Various electronic apparatuses, including a display apparatus, may be controlled by a remote controller which controls the apparatus remotely.

As the functions of electronic apparatuses develop, the number of controlling buttons of the remote controller increases.

Particularly, in the case of televisions which receive broadcast signals, various modes are required to control the television in conformity with the increase of the number of channels for digital broadcasting and because of the increase in the number of external apparatuses which may be connected to the television. Accordingly, the remote controller will require more buttons and thus, the structure of the remote controller becomes complicated.

As the remote controller is increasingly used, more interfaces are provided to the user. However, if the structure of the remote controller becomes complicated, it may be inconvenient for the user to use the remote controller.

Therefore, an additional function is requested to provide an intuitional control mode for the user.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

Aspects of the exemplary embodiments relate to a user terminal apparatus which provides a control mode by detecting the state of an apparatus to be controlled and a user interface (UI) providing method thereof.

According to an exemplary aspect, there is provided a user terminal apparatus providing a control mode to control an apparatus to be controlled and an application mode to operate applications, the apparatus includes a display unit which displays a control mode providing screen and an application mode providing screen, a user interface unit which receives an input of a user's order to select one of the control mode and the application mode, a communication interface unit which communicates with the apparatus to be controlled, and a controller which controls, if the control mode is selected, to display a control screen corresponding to a state of the apparatus to be controlled based on state information of the apparatus to be controlled which is received through the communication interface unit.

If the application mode is converted to the control mode, the controller may detect a state of the apparatus to be controlled at the time of the mode conversion and may control to display a control screen corresponding to a present state of the apparatus to be controlled.

If one of the control mode and the application mode is displayed and performed through the display unit, the controller may control the other mode to perform as a background mode.

The user interface unit may include a mode converting button to convert to one of the control mode and the application mode, and the mode converting button may be at least one of a soft button and a hard button.

The display unit and the user interface unit may be in an integral touch screen form.

The user terminal apparatus may be a remote controller.

The apparatus to be controlled may be an external display apparatus.

According to an exemplary aspect, there is provided a method of providing a user interface (UI) of a user terminal apparatus which provides a control mode to control an apparatus to be controlled and an application mode to operate applications, the method includes receiving an input of a user's order to select one of the control mode and the application mode, and if the control mode is selected and state information of the apparatus to be controlled is received, displaying a control screen corresponding to the state of the apparatus to be controlled based on the received state information.

If the application mode is converted to the control mode, the displaying the control screen may be executed to detect a state of the apparatus to be controlled at the time of a mode conversion and display a control screen corresponding to a present state of the apparatus to be controlled.

If one mode providing a screen between the control mode and the application mode is displayed and performed, the other mode may be performed as a background mode.

The user terminal apparatus may include a mode converting button to convert into either the control mode or the application mode, and the mode converting button may be at least one of a soft button and a hard button.

The user terminal apparatus may include a touch screen having functions of displaying and receiving an input of a user's order, simultaneously.

The user terminal apparatus may be a remote controller.

The apparatus to be controlled may be an external display apparatus.

Therefore, the user terminal apparatus provided with a plurality of operation modes may improve the user's convenience.

BRIEF DESCRIPTION OF THE DRAWINGS

The above and/or other aspects of the exemplary embodiments will be more apparent by describing certain exemplary embodiments with reference to the accompanying drawings, in which.

DETAILED DESCRIPTION

Certain exemplary embodiments will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

Figure 1:
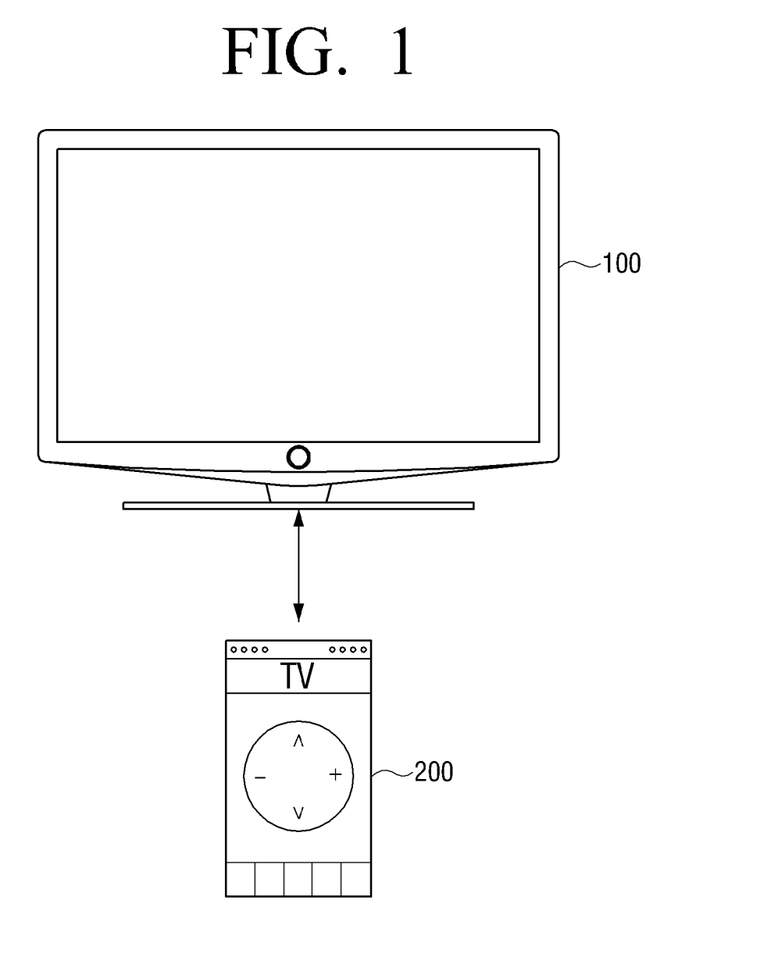
FIG. 1 illustrates a control system according to an exemplary embodiment.

FIG. 1 illustrates a control system according to an exemplary embodiment.

According to FIG. 1, a control system may comprise an apparatus to be controlled 100 and a user terminal apparatus 200.

The apparatus to be controlled 100 according to an exemplary embodiment may be embodied in various forms. For example, the apparatus to be controlled 100 may be either a static terminal apparatus, such as a digital TV and a desk-top computer, or a mobile terminal apparatus, such as a cellular phone, a smart phone, a notebook computer, a digital broadcast terminal apparatus, a Personal Digital Assistant (PDA), a Portable Multimedia Player (PMP), and a navigation device etc. For the sake of convenience, hereinafter the apparatus to be controlled 100 is a display apparatus, more specifically, a digital TV.

The user terminal apparatus 200 according to the exemplary embodiment may provide a plurality of operation modes. Specifically, the user terminal apparatus 200 may provide a control mode to control the apparatus to be controlled 100 according to a preset event or a user's order, e.g., a user input or a user command, and an application mode to perform the applications. Accordingly, the user terminal apparatus 200 may be embodied by a remote controlling device to control the apparatus to be controlled 100 and may operate and perform the applications.

Particularly, the user terminal apparatus 200 may receive the state information from the apparatus to be controlled 100 periodically or according to the preset event.

In this case, if the control mode is selected, the user terminal apparatus 200 may provide a control screen to control the apparatus to be controlled 100 based on the state information provided from the apparatus to be controlled 100.

The user terminal apparatus 200 may receive the state information of the apparatus to be controlled 100 through the network. Specifically, the user terminal apparatus 200 may receive the state information of the apparatus to be controlled 100 through various communication techniques, such as internet, LAN, ethernet, Wireless Fidelity (WI-FI), TCP/IP, IPX, firewire, IEEE 1394, CDMA, TDMA, BlueTooth (BT), High Definition Multimedia Interface (HDMI-CEC), wireless HDMI-CEC, Radio Frequency (RF), etc.

Hereinafter, the structure of the user terminal apparatus 200 according to an exemplary embodiment is described in more detail.

Figure 2:
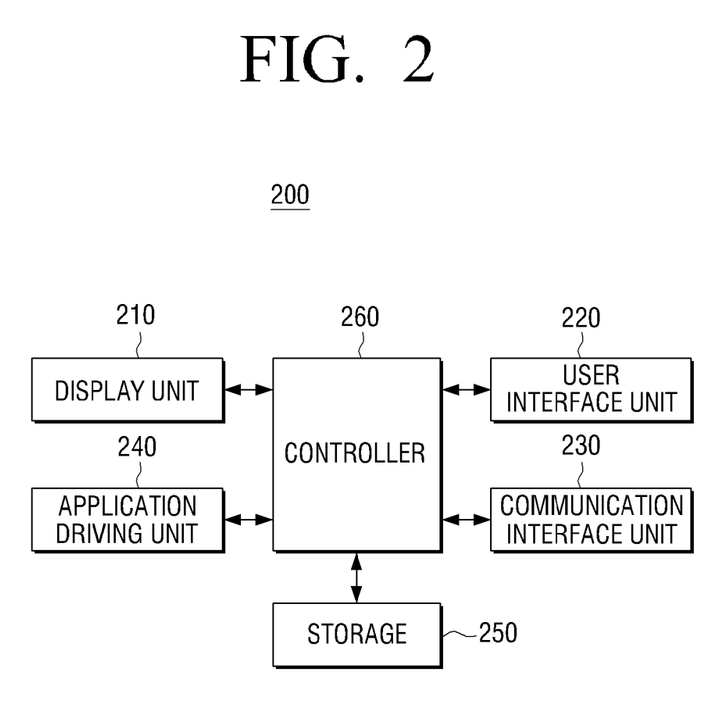
FIG. 2 is a block diagram illustrating a structure of a user terminal apparatus according to an exemplary embodiment.

FIG. 2 is a block diagram illustrating a structure of a user terminal apparatus according to an exemplary embodiment.

According to FIG. 2, the user terminal apparatus 200 includes a display unit 210, a user interface unit 220, a communication interface unit 230, an application driving unit 240, a storage 250, and a controller 260.

The user terminal apparatus 200 may be embodied to provide a plurality of operation modes. Specifically, the user terminal apparatus 200 may be embodied to support the control mode to control the apparatus to be controlled and the application mode to operate and perform the applications. Accordingly, the user terminal apparatus 200 may be embodied by a remote controller to control the apparatus to be controlled 100 and may be embodied to operate the application.

The display unit 210 displays various screens provided in the user terminal apparatus 200. Specifically, the display unit 210 may display various types of data in the user terminal apparatus 200.

In particular, the display unit 210 may display either the control mode providing screen to control the apparatus to be controlled (100 in FIG. 1) or the application mode providing screen to perform the application according to the preset event or the user's order.

The display unit 210 may be embodied by at least one of a liquid crystal display, a thin film transistor-liquid crystal display, an organic light-emitting diode, a flexible display, and a 3D display.

The display unit 210 may further be embodied in a touch screen type which forms an interactive layer with a touch pad. In this case, the display unit 210 may be used as the user interface unit 220 as well as an output apparatus. The touch screen may be configured to detect not only the touch input location and its region, but also the touch input pressure.

The user interface unit 220 receives the input of the user's order to select or control the control mode and the application mode. The user interface unit 220 may be embodied in the form of an integral touch screen with the display unit 210.

The communication interface unit 230 communicates with the apparatus to be controlled.

Specifically, the communication interface unit 230 may receive the state information of the apparatus to be controlled 100 periodically or according to the preset event. For example, the communication interface unit 230 may receive the state information of the apparatus to be controlled 100 through a network. The network may be embodied by various communication techniques such as internet, LAN, Wireless Fidelity (WI-FI), ethernet, TCP/IP, IPX, firewire, IEEE 1394, Think, CDMA, TDMA, BlueTooth (BT), High Definition Multimedia Interface (HDMI-CEC), wireless HDMI-CEC, Radio Frequency (RF), etc.

The communication interface unit 230 may transmit the control order to control the apparatus to be controlled 100 which is inputted through the control screen displayed in the display unit 210 in the control mode. In this case, the communication interface unit 230 may transmit the control order to the apparatus to be controlled through a manner of one way communication, such as infrared data association, besides the network communication.

In addition, the communication interface unit 230 may provide a passage through which the applications provided from the user terminal apparatus 200 in the application mode may be downloaded.

The communication manner between the user terminal apparatus 200 and the apparatus to be controlled 100 and the communication manner of downloading the applications may be embodied identically or differently from each other.

The application driving unit 240 operates and performs the applications provided from the user terminal apparatus 200. The application means feasible application programs and may include numerous types of multimedia content. The "multimedia content" can include text, audio, stationary images, animation, video, interactivities, content, Electronic Program Guide (EPG) content from a content provider, electronic messages received from the users, and information relating to the present event, however, it is not limited to these examples.

The storage 250 is a storage medium which stores programs required to operate the user terminal apparatus 200 and may be embodied by a memory, a Hard Disk Drive (HDD) etc. For example, the storage 250 may include a ROM which stores programs to operate the controller 260 and a RAM which temporarily stores data according to the operation of the controller 260. In addition, an Electrically Erasable and Programmable ROM (EEPROM) may be provided to store various reference data.

The storage 250 may store the downloaded applications or the state information of the apparatus to be controlled which is received through the communication interface unit 230.

Furthermore, the storage 250 may store the identifying information of the apparatus to be controlled, each operation state information, control screen information corresponding to the each operation state and may provide the control screen corresponding to the state of the apparatus to be controlled based on the stored information.

The controller 260 controls the overall operation of the user terminal apparatus 200.

The controller 260 may control the user terminal apparatus 200 to display the control screen corresponding to the state of the apparatus to be controlled 100 based on the state information of the apparatus to be controlled 100 which is received through the communication interface unit 230 in the control mode.

Specifically, if the operation mode of the user terminal apparatus 200 is converted from the application mode to the control mode, the controller 260 detects the state of the apparatus to be controlled 100 at the time of the mode conversion and controls to display the control screen corresponding to the present state of the apparatus to be controlled.

For example, if the operation mode of the user terminal apparatus 200 is converted from the application mode to the control mode and the apparatus to be controlled 100 is in the state of airing a TV program, a UI relevant thereto may be provided. Otherwise, if the apparatus to be controlled 100 is in the state of an external input, such as playing a DVD, a UI relevant thereto is provided.

If one operation mode providing a screen is performed in either the control mode or the application mode by being displayed through the display unit 210, the controller 260 controls the remaining mode to perform as a background mode.

The user terminal apparatus 200 may be further provided with a mode converting button (not shown) to convert the mode to the control mode or the application mode.

If the mode converting button (not shown) is embodied in a soft button form, it may be embodied in a region of the user interface unit 220 of the touch screen type.

Otherwise, the mode converting button (not shown) may be embodied in a hard button form. In this case, the mode converting button may be provided in a separate region instead of the user interface unit 220 of the touch screen type.

The user terminal apparatus 200 may receive the applications from an external memory (not shown) or an internal memory (not shown) besides the network. The internal memory (not shown) may include a computer memory, such as a Random Access Memory (RAM), a flash memory, and a Read Only Memory (ROM), however, it is not limited thereto. The external memory (not shown) may include a Hard Disk Drive (HDD), a Compact Disc (CD) ROM, a memory card, and a Universal Serial Bus (USB) flash drive, etc, however, it is not limited thereto.

Figure 3A:
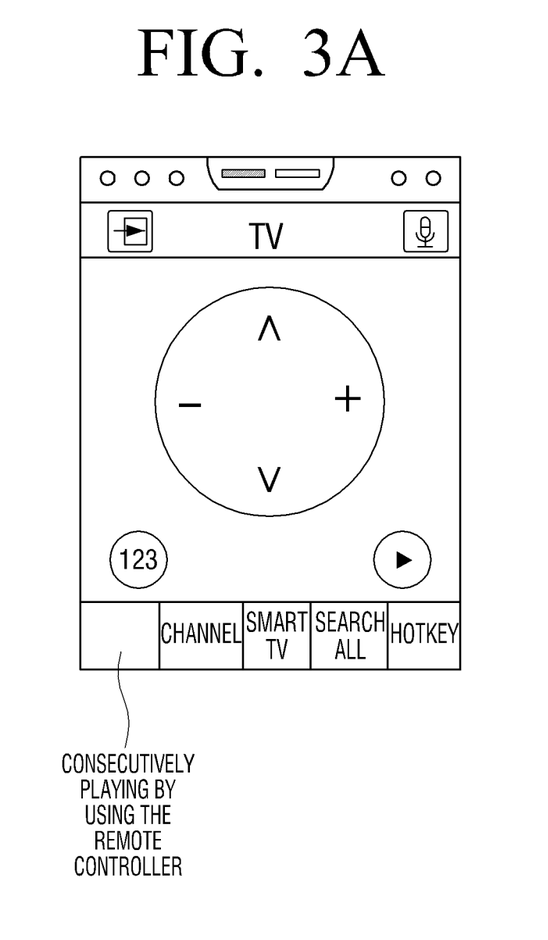
FIG. 3A to 3C illustrate the operation mode screens according to exemplary embodiments.
Figure 3B:
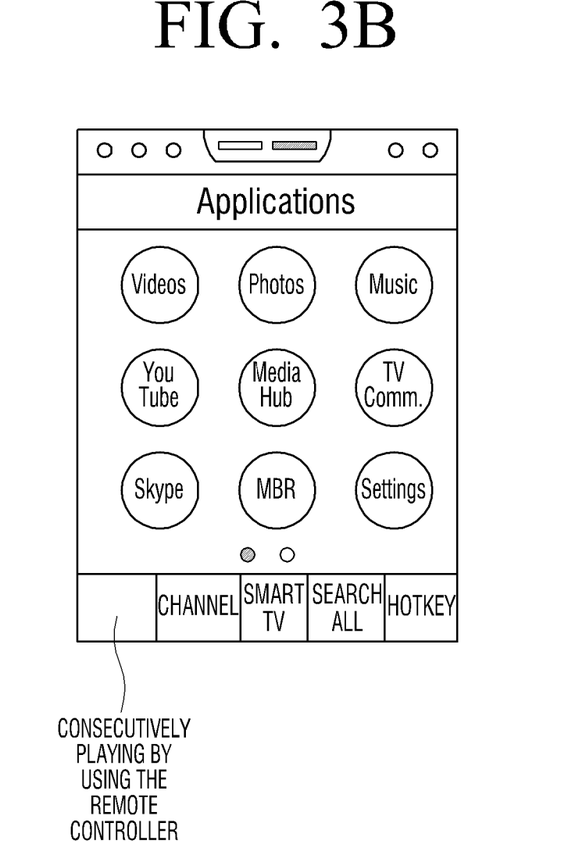
Figure 3C:
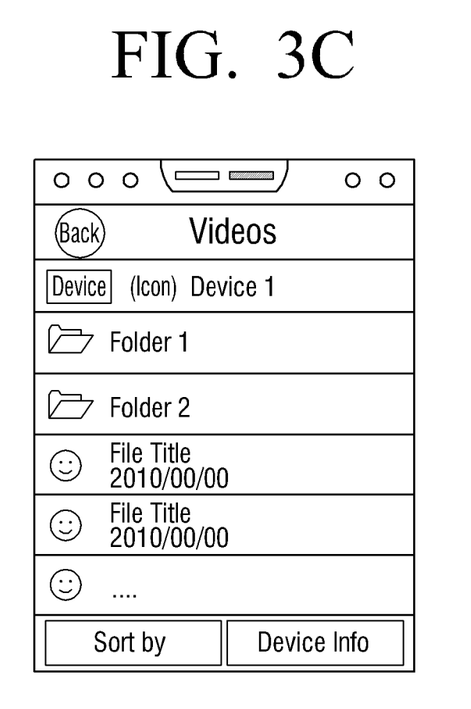

FIG. 3A to 3C illustrate the operation mode screens according to some exemplary embodiments.

FIG. 3A depicts a control mode screen according to an exemplary embodiment.

According to FIG. 3A, a UI screen may be provided to control the apparatus to be controlled in the control mode.

Specifically, a UI screen corresponding to the present state of the apparatus to be controlled may be provided.

For example, if the apparatus to be controlled is a digital TV and a digital TV program is airing on the apparatus, a UI screen including the menus of a channel and a volume adjusting UI, and an Electronic Program Guide (EPG) may be provided to control the digital TV.

Otherwise, if the apparatus to be controlled is a digital TV and the user is watching a DVD through an external input mode, a UI screen including the menus for a DVD player such as play, pause, stop, fast forwarding may be provided to control the operation of the DVD.

According to FIG. 3B, a UI screen to operate and perform the applications may be provided in the application mode.

For example, a UI screen displaying various applications in icon form may be provided.

In FIG. 3C, a conversion screen is depicted when the video application is selected from the UI screen of FIG. 3B. That is, if a preset application is selected from the UI screen of FIG. 3B, the screen may be converted to a screen corresponding to the selected application.

Figure 4A:
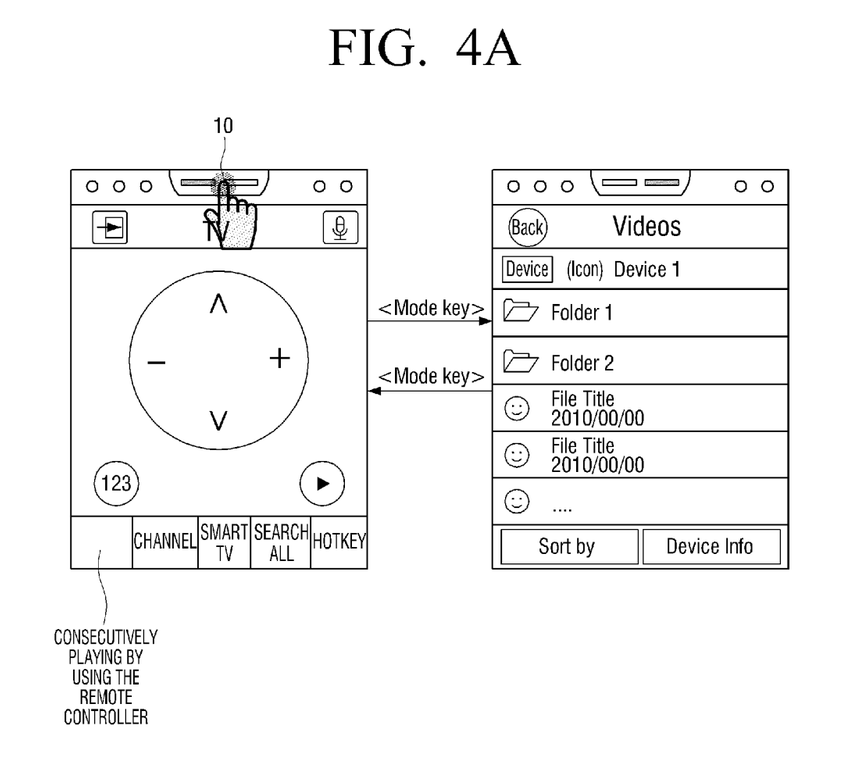
FIGS. 4A and 4B illustrate the screen conversion procedures through a mode conversion according to an exemplary embodiment.
Figure 4B:
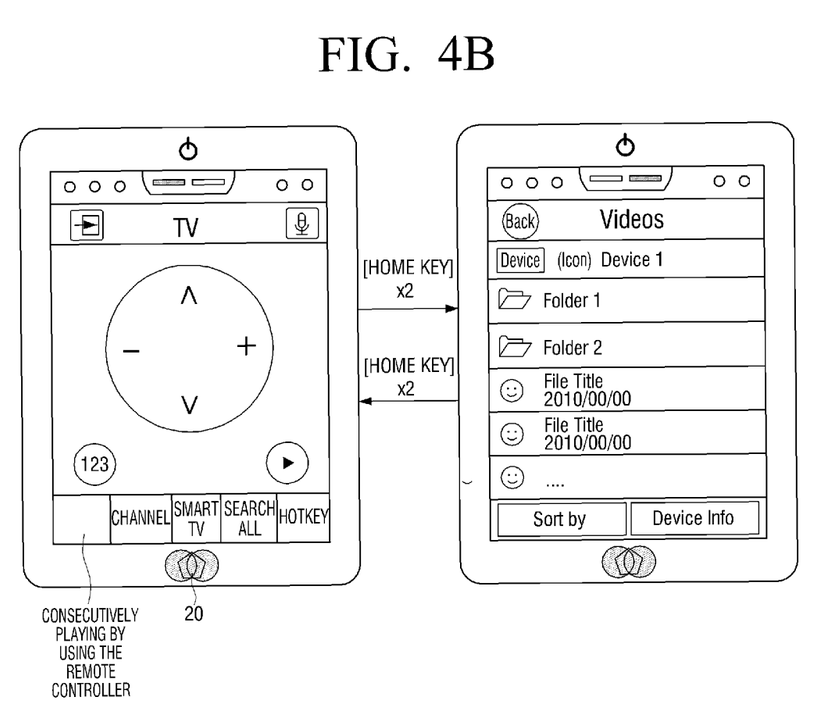

FIGS. 4A and 4B illustrate the screen conversion procedures through a mode conversion according to an exemplary embodiment.

According to FIG. 4A, if a soft button 10 is selected to convert the operation mode, the operation mode may be converted from the control mode to the application mode. In this case, the screen may be converted to the last screen state of the application mode instead of an initial screen state of the application mode. For example, if the screen is converted from the state of FIG. 3C to the control mode and again to the application mode, the screen may be converted as shown in FIG. 3C.

Otherwise, if a hard button 20 is double clicked for the operation mode conversion, the operation mode may be converted from the control mode to the application mode as shown in FIG. 4B. In this case, the screen may be converted to the last state of the application mode instead of the initial state of the application mode like FIG. 4A.

Figure 5:
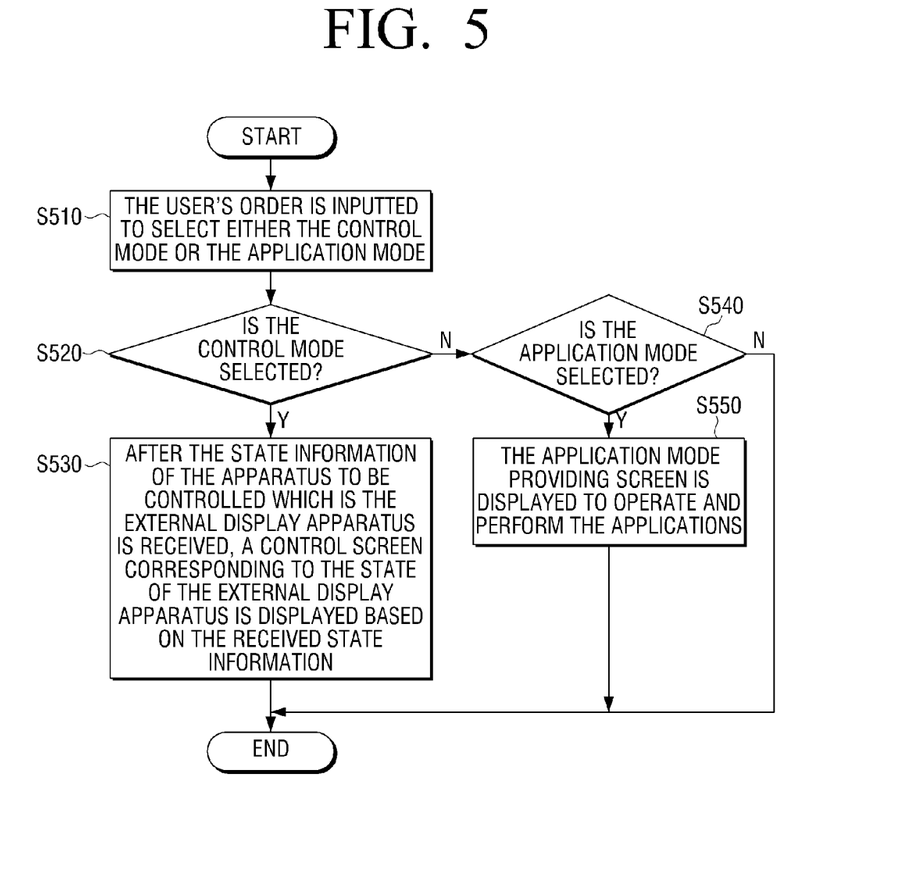
FIG. 5 is a flowchart describing a control method of a user terminal apparatus according to an exemplary embodiment.

FIG. 5 is a flowchart describing a control method of a user terminal apparatus according to an exemplary embodiment.

According to a UI providing method of the user terminal apparatus which provides a control mode to control the apparatus to be controlled and an application mode to operate the applications, if a user's order is inputted to select either the control mode or the application mode (S510), it is determined that whether the control mode is selected (S520).

If the control mode is selected (S520:Y), the state information of the apparatus to be controlled is received and a control screen corresponding to the state of the apparatus to be controlled based on the received state information is displayed (S530).

If the control mode is not selected (S520:N), it is detected whether the application mode is selected (S540).

If the application mode is selected (S540:Y), an application mode providing screen to operate and perform the applications is displayed (S550).

In this case, if the application mode is converted into the control mode, displaying the control screen to provide the control mode (S530) may be executed to detect the state of the apparatus to be controlled at the time of the mode conversion and the control screen corresponding to the present state of the apparatus to be controlled is displayed.

In addition, when a mode providing a screen for either the control mode or the application mode is displayed and performed, the other mode may be performed as a background mode.

The user terminal apparatus includes a mode converting button to convert into either the control mode or the application mode, and the mode converting button may be embodied by at least one of the soft button and the hard button.

The user terminal apparatus may include a touch screen having functions of displaying and receiving an input of a user's order, simultaneously.

In addition, the user terminal apparatus may be embodied by a remote controller.

In an exemplary embodiment, the apparatus to be controlled 100 by the user terminal apparatus 200 is the display apparatus, however, it is not limited thereto and may be applied to an apparatus having no display function but has an audio function. That is, the above exemplary embodiments may be applied to any electronic product or apparatus that is controllable by a remote controller.

In addition, the exemplary embodiments recite the control mode and the application mode, however, the operation mode of the user terminal apparatus is not limited thereto.

As apparent from the foregoing, the user terminal apparatus is provided with a plurality of operation modes, thereby enhancing the user's convenience.

The foregoing exemplary embodiments are merely exemplary and are not to be construed as limiting the inventive concept. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A user terminal apparatus providing a control mode to control an apparatus to be controlled and an application mode to operate applications, comprising:
    a display unit which displays one of a control mode providing screen and an application mode providing screen;
    a user interface unit which receives a user input to select one of the control mode, which provides a UI screen to control the apparatus, and the application mode, which provides a UI screen for operating the applications;
    a communication interface unit which communicates with the apparatus to be controlled; and
    a controller which controls, if the control mode is selected, to display a control screen corresponding to a state of the apparatus to be controlled based on state information of the apparatus to be controlled which is received through the communication interface unit,
    wherein the user interface unit further comprises a mode converting button that,
    in response to the user terminal apparatus being in the application mode when the mode converting button is activated, converts to the control mode, and
    in response to the user terminal apparatus being in the control mode when the mode converting button is activated, converts to the application mode.

2. The apparatus as claimed in claim 1, wherein if the application mode is converted to the control mode, the controller detects a state of the apparatus to be controlled at a time of a mode conversion and controls to display a control screen corresponding to a present state of the apparatus to be controlled.

3. The apparatus as claimed in claim 1, wherein if one of the control mode and the application mode is displayed and performed through the display unit, the controller controls the other mode to perform as a background mode.

4. The apparatus as claimed in claim 1, wherein the mode converting button is at least one of a soft button and a hard button.

5. The apparatus as claimed in claim 1, wherein the display unit and the user interface unit are in an integral touch screen form.

6. The apparatus as claimed in claim 1, wherein the user terminal apparatus is a remote controller.

7. The apparatus as claimed in claim 1, wherein the apparatus to be controlled is an external display apparatus.

8. The apparatus according to claim 1, wherein the state information of the apparatus to be controlled comprises an operating state of the apparatus to be controlled.

9. The apparatus according to claim 8, wherein the operating state of the apparatus to be controlled comprises one of airing a program and playing content from a storage device.

10. A method of providing a user interface (UI) of a user terminal apparatus which provides a control mode to control an apparatus to be controlled and an application mode to operate applications, comprising:
    receiving a user input to select one of the control mode and the application mode; and
    if the control mode is selected and state information of the apparatus to be controlled is received, displaying a control screen corresponding to the state of the apparatus to be controlled based on the received state information; and
    converting to the control mode in response to the user terminal apparatus being in the application mode when a mode converting button is activated, and
    converting to the application mode in response to the user terminal apparatus being in the control ode when the mode converting button is activated.

11. The method as claimed in claim 10, wherein if the application mode is converted to the control mode, the displaying the control screen is executed to detect a state of the apparatus to be controlled at a time of a mode conversion and display a control screen corresponding to a present state of the apparatus to be controlled.

12. The method as claimed in claim 10, wherein if one of the control mode and the application mode is displayed and performed, the other mode is performed as a background mode.

13. The method as claimed in claim 10, wherein the mode converting button is at least one of a soft button and a hard button.

14. The method as claimed in claim 10, wherein the user terminal apparatus comprises a touch screen having functions of displaying and receiving the user input, simultaneously.

15. The method as claimed in claim 10, wherein the user terminal apparatus is a remote controller.

16. The method as claimed in claim 10, wherein the apparatus to be controlled is an external display apparatus.

17. A remote controller for providing a mode of operation, comprising:
    a control mode and an application mode, wherein the control mode controls an apparatus and the application mode operates an application,
    a display unit which displays one of a control mode providing screen and an application mode providing screen;

if the control mode is selected and state information of the apparatus to be controlled is received, displaying a control screen corresponding to the state of the apparatus to be controlled based on the received state information;

a user interface unit which receives an input for one of the control mode and the application mode and which comprises a mode converting button that, in response to the remote controller being in the application mode when the mode converting button is pressed, converts to the control mode, which provides a UI screen to control the apparatus, and in response to the remote controller being in the control mode when the mode converting button is pressed, converts to the application mode, which provides a UI screen for operating the application; and a controller which controls the user terminal apparatus based on the received input.

18. The remote controller according to claim 17, wherein the display unit is a touch screen type and the mode converting button is a soft button which is embodied in a region of the user interface unit of the touch screen type.

19. A user terminal apparatus providing a control mode to control an external apparatus and an application mode to operate applications, comprising:

a display unit which displays a first UI comprising at least one application which is installed to the user terminal apparatus and a second UI for controlling the external apparatus;

a communication interface unit which receives state information of the external apparatus from the external apparatus; and a controller which controls the display unit to display the first UI in the application mode, and if the application mode is converted to the control mode, determines a state of external apparatus at a time of a mode conversion based on the received state information and controls the display unit to display the second UI corresponding to the state of the external apparatus.

20. The apparatus as claimed in claim 19, further comprising:

a user interface unit which receives a user input to select one of the control mode and the application mode, wherein the user interface unit further comprises a mode converting button that, in response to the user terminal apparatus being in the application mode when the mode converting button is activated, converts to the control mode, and in response to the user terminal apparatus being in the control mode when the mode converting button is activated, converts to the application mode.

21. An apparatus providing a television control mode to control a television and an application mode to operate applications, the apparatus comprising:

a display configured to display one of a television (TV) control mode providing screen and an application mode providing screen;

a user interface configured to receive a user input to select one of the television control mode, which provides a UI screen to control the television, and the application mode, which provides a UI screen for operating the applications;

a communication interface configured to communicate with the television; and a controller configured to control, in response to the TV control mode being selected, to display a control screen to control the television based on state information of the television which is received through the communication interface, wherein the user interface further comprises a mode converting button that, in response to the apparatus being in the application mode when the mode converting button is activated, converts to the TV control mode, and in response to the apparatus being in the TV control mode when the mode converting button is activated, converts to the application mode.

22. The apparatus according to claim 21, wherein in response to the application mode being converted to the TV control mode, the controller detects a state of the television at a time of a mode conversion and controls to display a control screen corresponding to a present state of the television.

23. The apparatus according to claim 21, wherein in response to one of the TV control mode and the application mode being displayed and performed through the display, the controller controls the other of the TV control mode and the application mode to perform as a background mode.

24. The apparatus according to claim 21, wherein the mode converting button is at least one of a soft button and a hard button.

25. A controlling apparatus for controlling a television and operating an application, the controlling apparatus comprising:

a display configured to display one of a television controlling mode and an application mode according to a television controlling mode information and an application mode information stored in the controlling apparatus;

a user interface configured to receive an input selecting one of the television controlling mode and the application mode; and a controller configured to control, in response to the television controlling mode being selected and state information of the television being received, to display a control screen to control the television based on the received state information, wherein the user interface further comprises a mode converting button that, in response to the controlling apparatus being in the application mode when the mode converting button is activated, converts to the television controlling mode, and in response to the controlling apparatus being in the television controlling mode when the mode converting button is activated, converts to the application mode.

26. The apparatus according to claim 25, wherein the application comprises a plurality of different applications, and the controller is configured to control to display the control screen corresponding to a selected one of the plurality of applications in order to control the selected one of the plurality of applications.

27. The apparatus according to claim 25, wherein the controlling apparatus is located remotely from the television.

28. The apparatus according to claim 25, wherein the display is a touch screen.

29. A method of providing a user interface (UI) of an apparatus which provides a television control mode to control a television and an application mode to operate applications, the method comprising:

receiving an input to select one of the television control mode, which provides a UI screen to control the television, and the application mode, which provides a UI screen for operating the applications;

if the television control mode is selected and state information of the television is received, displaying a control screen corresponding to the state of the television based on the received state information; and converting to the television control mode in response to the apparatus being in the application mode when a mode converting button is activated, and converting to the application mode in response to the apparatus being in the television control mode when the mode converting button is activated.

30. The method according to claim 29, further comprising, in response to receiving an input to convert the application mode to the television control mode, detecting a state of the television at a time of a mode conversion and displaying a control screen corresponding to a present state of the television.

31. The method according to claim 29, wherein in response to one of the television control mode and the application mode being displayed and performed, controlling the other of the television control mode and the application mode to perform as a background mode.

32. A non-transitory computer-readable recording medium having recorded thereon a program which when executed causes an apparatus to execute a method of providing a user interface (UI) of an apparatus which provides a television control mode to control a television and an application mode to operate applications, the method comprising:

receiving an input to select one of the television control mode, which provides a UI screen to control the television, and the application mode, which provides a UI screen for operating the applications;

if the television control mode is selected and state information of the television is received, displaying a control screen corresponding to the state of the television based on the received state information; and converting to the television control mode in response to the apparatus being in the application mode when a mode converting button is activated, and converting to the application mode in response to the apparatus being in the television control mode when the mode converting button is activated.

\* \* \* \* \*